No. 857,405. PATENTED JUNE 18, 1907.
C. KEMMERER.
NUT LOCK.
APPLICATION FILED OCT. 4, 1906.
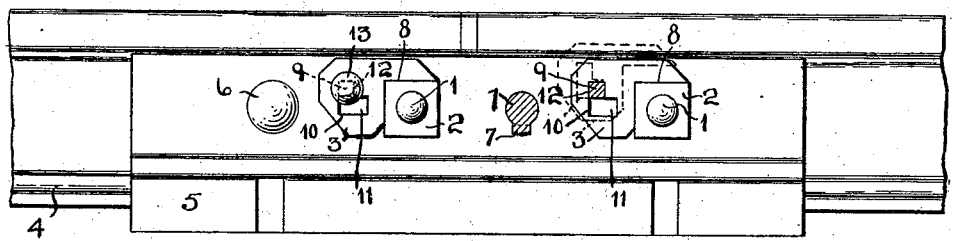
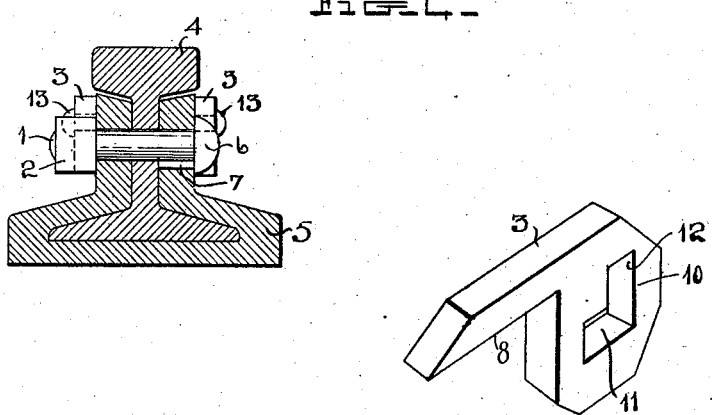
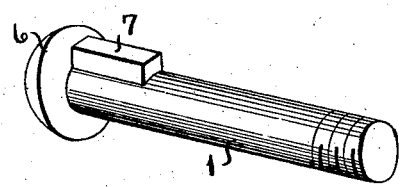
Witnesses
L. B. James
L. O. Hilton
Inventor
Chas. Kemmerer
by H. B. Willson & Co
Attorneys

UNITED STATES PATENT OFFICE.

CHARLES KEMMERER, OF BARBERTON, OHIO.

NUT-LOCK.

No. 857,405.  Specification of Letters Patent.  Patented June 18, 1907.

Application filed October 4, 1906. Serial No. 337,433.

*To all whom it may concern:*

Be it known that I, CHARLES KEMMERER, a citizen of the United States, residing at Barberton, in the county of Summit and State of Ohio, have invented certain new and useful Improvements in Nut-Locks; and I do declare the following to be a full, clear, and exact description of the invention, such as will enable others skilled in the art to which it appertains to make and use the same.

This invention relates to improvements in nut locks and consists of the novel construction, combination and arrangement of parts herein-after described and claimed.

The object of the invention is to provide a simple and inexpensive means for effectively locking nuts and bolts of any description.

The above and other objects which will appear as the nature of the invention is better understood, are accomplished by the construction illustrated in the accompanying drawings in which,—

Figure 1 is a side elevation, partly in section, of a rail joint showing its fastening bolts and nuts locked in accordance with the invention; Fig. 2 is a vertical transverse sectional view. Fig. 3 is a perspective view of the locking plate; and Fig. 4 is a similar view of the bolt.

In the accompanying drawings the invention is shown as applied to a bolt and nut of a rail joint, but it will be understood that it may be applied to nuts and bolts used for various other purposes.

The numeral 1 in the drawings denotes a bolt and the numeral 2 a nut which is adapted to be locked upon the bolt by the improved locking plate 3. The nut and bolt are of usual form, the bolt passing through alining openings in the rail 4 and in the fish plates or portions 5 of the chair which surrounds the rail joint. The bolt 1 is held against rotation in the rail and its fish plates by forming upon it adjacent to its head 6 a lug or key 7 which enters a seat or recess in that fish plate against which the head of the bolt bears.

The nut 2 is screwed upon the opposite projecting end of the bolt and against the other fish plate as will be readily understood upon reference to Fig. 2 of the drawing. While the nut may be of any desired polygonal form or shape, it is here shown as square and at one end of the locking plate 3 is formed a right angular recess 8 adapted to engage one of the corners of the nut.

The locking plate 3 is loosely mounted upon a pin or stud 9 projecting from the outer face of one of the fish plates 5, so that it may be moved a sufficient distance from the nut to permit the latter to be readily rotated, or moved into close engagement with the nut to hold it against rotation. In order to permit this, the pin or stud 9 extends through a substantially right angular shaped slot 10 formed in the plate 3.

It will be seen that when the pin is in the horizontal portion 11 of the slot 10, as indicated in dotted lines in Fig. 1, the plate will have its recessed end 8 disposed a sufficient distance from the nut to allow the latter to rotate and that when said pin or stud is in the upper end of the vertical portion 12 of the slot 10 the walls of the recess 8 will engage two adjacent side faces of the nut and effectively prevent the latter from rotating hence the plate moves in planes parallel with the walls of the recess 8.

A head 13 upon the outer end of the pin or stud 9 retains the locking plate in sliding engagement with the outer face of the fish plate upon which it is mounted. The pin or stud 9 is preferably square or rectangular in cross section as seen in Fig. 1 so that the locking plate is prevented from rotating upon it.

The construction, operation and advantages of the invention will be readily understood from the foregoing description taken in connection with the accompanying drawings.

It will be seen that this device will effectively lock the nut and bolt against rotation and that it may be very readily retracted from engagement with the nut to permit it to be removed or tightened.

Various changes in the form, proportion and the minor details of construction may be resorted to without departing from the principle or sacrificing any of the advantages of this invention, as defined in the appended claims.

Having thus described my invention, what I claim as new and desire to secure by Letters-Patent, is;—

1. In a nut lock, an element, a bolt projecting therefrom, a nut upon said bolt, a headed pin or stud upon said element, a locking plate having a longitudinal slot with an offset formed at its upper side at the outer end of the plate, said plate having a lateral arm projecting from its opposite inner end at its upper edge to form a nut-receiving recess, whereby said plate is adapted to slide on said element in planes parallel with the walls of said recess.

2. In a nut lock, an element, a bolt projecting therefrom, a nut upon said bolt, a headed pin, a locking plate having a right-angular slot through which said pin projects, said slot having its vertical portion arranged at the outer end of said plate and extended upwardly and a lateral arm at its upper inner edge forming a right angular nut engaging recess whereby said plate is adapted to move vertically and laterally to lock and unlock the nut.

In testimony whereof I have hereunto set my hand in presence of two subscribing witnesses.

CHARLES KEMMERER.

Witnesses:
ROSALIA WERNER,
SENEY A. DECKER.